Aug. 11, 1942.                     W. SPENCE                     2,292,720
                    MACHINE TOOL FOR TURNING IRREGULAR SHAPES
                              Filed March 22, 1941
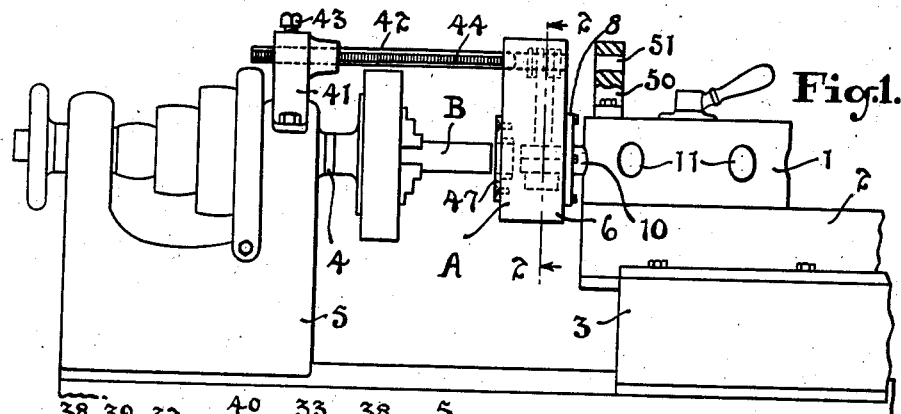
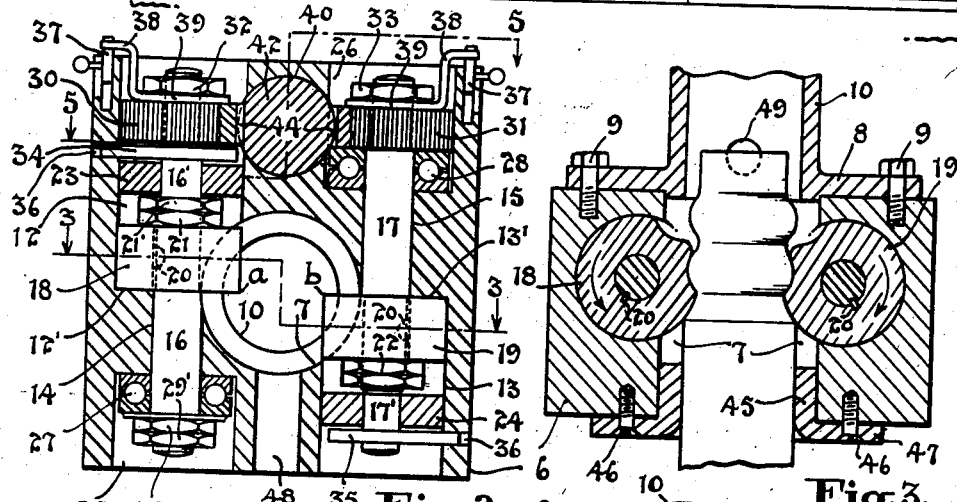
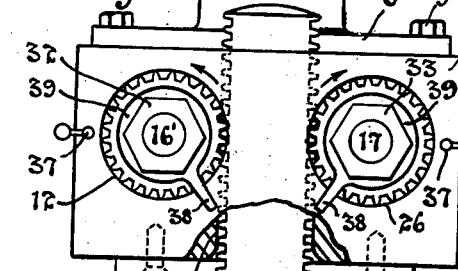  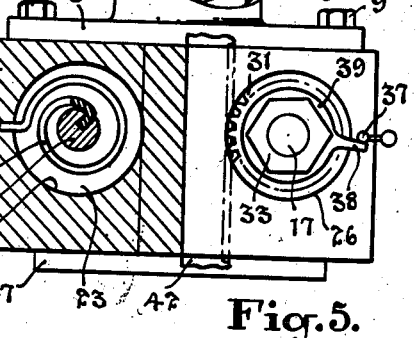
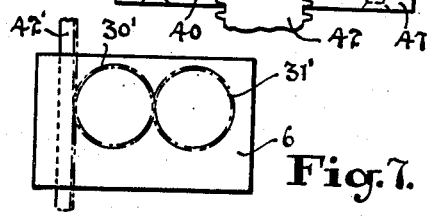  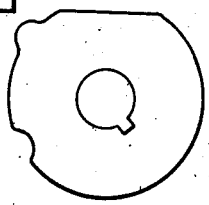
Inventor.
William Spence.

Patented Aug. 11, 1942

2,292,720

UNITED STATES PATENT OFFICE 2,292,720

MACHINE TOOL FOR TURNING IRREGULAR SHAPES

William Spence, Toronto, Ontario, Canada

Application March 22, 1941, Serial No. 384,610

7 Claims. (Cl. 82—13)

This invention relates to a box tool or the like which is particularly applicable to production lathes of the turret type and the principal object of the invention is to enable the rapid production of intricately profiled articles on such a machine which has not heretofore been possible without involving separate and costly operations, thereby increasing the capacity of the machine and providing for greater versatility and scope in production, while at the same time effecting important reductions in the cost of producing such articles.

The principal features of the invention reside in the novel construction and arrangement of parts whereby a tool, which is adapted to be attached either to the usual turret head of a lathe or which may be mounted in a tail stock or on the carriage, is provided with a pair of disc-like cutters which are suitably profiled and are adapted to be uniformly rotated as the carriage is advanced toward the work so that the profiled surfaces of the cutter discs will cut into the work or bar stock to varying depths and thereby automatically produce the desired profile on the work, the respective cutter discs co-operating with the work at diametrically opposite points, thereby producing a balanced thrust on the work and minimizing chatter.

Further and important features will be apparent in the following description.

In the drawing

Figure 1 is a front elevational view of the head end portion of a lathe of the turret type illustrating the application of the present invention thereto.

Figure 2 is an enlarged transverse sectional elevation through the profiling tool taken on the line 2—2 of Figure 1.

Figure 3 is a sectional plan view through the device taken on the line 3—3 of Figure 2.

Figure 4 is an elevational plan view of the device broken away in part and illustrating the rack member in cooperative association therewith.

Figure 5 is a part sectional elevational plan taken on the line 5—5, Figure 2.

Figure 6 is a plan view of an exemplary form of cutter disc.

Figure 7 is a miniature plan view of a modified form of the present invention.

In the preferred form of the invention shown the profiling tool is represented in general at A in Figure 1 where it is shown mounted on a conventional turret 1 which is mounted on a longitudinally reciprocable carriage 2 in the lathe bed 3.

The work to be profiled is shown at B mounted for rotation with the lathe spindle 4 rotatably mounted in the usual head 5.

Referring in detail to the unit A, this is here shown formed of a metal block 6 of rectangular form having an axial bore 7 extending therethrough. A flange plate 8 is secured to one face of the block 6 preferably in a detachable or interchangeable manner by screws 9 and the flange carries a sleeve 10 which projects concentrically of the bore 7 and is adapted to be inserted in one of the tool-holding orifices 11 of the turret head 1. This sleeve may be tapered or otherwise shaped to fit into the tapered socket of a tail stock or may be adapted for direct securement in a tool holder or to the carriage directly. In any case the block is adapted to be supported with the axis of the bore 7 in alignment with the axis of the work spindle 4 so that the work B may enter the bore 7 as the carriage is advanced.

The block 6 is provided with cylindrical bores 12 and 13 leading inwardly from the top and bottom respectively of the block and terminating in plane surfaces 12' and 13' which are preferably in alignment with each other and with the axis of the bore 7. The axes of the bores 12 and 13 are offset from the axis of the bore 7 and are disposed in a common plane right-angularly intersecting the axis of the bore 7, or substantially so.

Journal bores 14 and 15 of reduced size extend axially from the bottoms of the bores 12 and 13 respectively, and in these are rotatably mounted shaft members 16 and 17 having end portions which extend longitudinally of the bores 12 and 13 respectively.

Disc-like cutters 18 and 19 are non-rotatably and removably associated with the shafts 16 and 17 respectively within the bores 12 and 13 and they preferably present flat end faces in snug surface contact with the plane areas 12' and 13'. The discs 18 and 19 are here shown keyed to the respective shafts at 20, and clamping nuts 21 and 22 are threaded on the shafts for clamping co-operation with the disc cutters 18 and 19.

The shafts 16 and 17 are preferably provided with reduced portions 16' and 17' beyond the clamping nuts 21 and 22 and bearing bushings 23 and 24 are here shown inserted into the bores 12 and 13 in co-operative relation to the reduced portions 16' and 17'.

Shallow bores 25 and 26 are formed in the block 6 in alignment with the bores 12 and 13 respectively and into these the ends of the of the respective shafts 16 and 17 project.

End thrust bearings, here shown of the disc and ball type, as represented at 27 and 28, are accommodated within the shallow bores 25 and 26 and these are adapted to receive the axial thrusts imparted to the shafts 16 and 17 through cutting engagement of the discs with the work, as will be hereinafter apparent, while permitting the shafts to be rotated freely.

Clamping nuts 29 are threaded on the lower end of the shaft 16 within the bore 25 and these, in co-operation with the clamping nuts 21, may be adjusted to eliminate any end play, the associated locking nut members 21' and 29' serving to lock the elements in their adjusted relation.

Toothed pinions 30 and 31 are non-rotatably mounted on the upper ends of the shafts 16 and 17 in a common plane within the bores 12 and 26 respectively, and these are secured by clamping nuts 32 and 33 threaded on the upper ends of the shafts.

Spiral spring elements 34 and 35 are coiled about the shaft portions 16' and 17' and anchored thereto at the inner ends as represented in Figure 5, and the outer ends are anchored in recesses 36 in the wall of the respective bores. These spring elements are adapted to urge the shafts 16 and 17 in a return direction and the extent of this return rotation is here shown as limited by stop members 37 which are preferably retractibly mounted and when projected, as represented in Figures 2 and 5, are engaged by finger members 38 which extend from a disc-like portion 39, here shown as adjustably secured on the respective shafts by the clamping nuts 32 and 33.

A guide bore 40 extends through the block 6 parallel with the bore 7 and centrally between the pinions 30 and 31 so that the peripheral teeth thereof extend into the bore. Mounted on the head 5 is a bracket 41 which is bored horizontally in alignment with the bore 40 and a rack member 42 is slidably adjustable in the bore of the bracket 41 and adapted to be secured therein by a suitable locking means 43 so that when the carriage 2 is moved toward the head of the rack 42 will enter the guide bore 40 and the side teeth 44 thereof will mesh with the teeth of the respective pinions 30 and 31, causing these to be rotated uniformly in opposite directions.

A guide sleeve 45 is formed to snugly fit the bore 7 and is removably and interchangeably secured to the block 6 by screws 46 extending through the flange 47 thereof, the interior bore of the sleeve being of a diameter corresponding to the diameter of the work B so that as the carriage is advanced the work will enter the sleeve and be accurately guided thereby against lateral thrusts or chattering.

As shown particularly in Figure 3, the cutter discs 18 and 19 are specially profiled peripherally in accordance with the particular profile it is desired to impart to the work as it is rotated therebetween. It will be noted that, as the carriage is advanced the rack 42 will be brought into operative engagement with the pinions 30 and 31, causing the cutter discs 18 and 19 to be uniformly rotated, and simultaneously with this engagement of the pinions and rack the displacement of the cutter discs with the carriage brings these into cutting engagement with the rotating work, and as the carriage advances further the rotational effect imparted to the cutter discs will cause different peripheral portions of the cutters to be progressively presented to the work so that grooves or beads or other formations may be imparted to the work, as represented in an exemplary manner in Figure 3.

Each of the cutter discs are advantageously similarly profiled so that a similar cutting action will be effected at each side of the work and it is important to note that this cutting action in being applied at diametrically opposite points, as represented at a and b, Figure 2, will effectively neutralize or balance lateral thrusts on the work, and this, in conjunction with the guiding influence of the sleeve 45, will minimize chatter and result in work of high quality and accuracy being produced.

A passage 48 formed in the block 6 leads from the cutting zone to conduct away the cuttings and if necessary a cutting fluid may be introduced into the hollow sleeve 10 at 49 to cool and lubricate the cutters and wash away the cuttings.

It will be readily appreciated that many different forms of work may be carried out with a device of this nature and cutters may be selected having any required form of profile, as represented by way of example in Figure 6.

It will be noted that during the advance movement of the carriage the shafts 16 and 17 will be rotated as described which will cause the spring elements 34 and 35 to be tensioned and the stop fingers 38 will be carried away from the projected stops 37 and, when the carriage has been advanced sufficiently far to perform the operation desired on the work, the carriage movement is reversed and due to the energy stored in the springs 34 and 35 there will be no lost motion between the rack 42 and pinions 30 and 31, so that the cutter discs 18 and 19 will not drag or bite into the work but will instantly rotate in the reverse direction so that the profiled surfaces thereof will mesh accurately with the profiled surface of the work and will roll thereover as the work is retracted therebetween. The cutters will finally come to rest in accurately positioned relation by reason of engagement of the fingers 38 with the stop members 37 and by this means the teeth of the pinions will also be properly positioned for subsequent simultaneous engagement with the rack.

When it is desired to profile a considerable length of work in one operation requiring rotation of the cutter discs 18 and 19 more than one revolution, the stops 37 may be retracted to permit unobstructed passage of the fingers 38 and these may be returned again at the required point in the return operation of the carriage.

The profiled portion of the work may extend freely into the tubular sleeve 10, as represented in Figure 3, which if desired may also be formed to engage the work in guiding and supporting contact.

While I have shown and described a device employing a pair of cutter discs operating at diametrically opposite points on the work, it will be readily appreciated that other arrangements of the cutters may be resorted to as may also the manner of effecting rotation of the cutters, and, as represented in Figure 7, the pinions 30' and 31' may be directly meshed while the rack 42' engages only one of the pinions.

A guide bracket 50 may optionally be provided on the turret head 1 having a guide orifice 51 in alignment with the rack 42 so that the latter may enter therein and thereby exert a steadying influence, minimizing bending thrusts on the rack and supporting the block 6 against tortional thrusts.

A device such as described is possessed of considerable utility and when applied to a turret or production lathe it will considerably enhance the capacity thereof and extend its field of usefulness, enabling the production in quantity of articles of intricate profile or design.

What I claim as my invention is:

1. A profiling tool adapted for attachment to lathes, comprising a block, shafts rotatably mounted in said block and having profiled cutter discs mounted thereon, said block having a cylindrical guide orifice therethrough for receiving and rotatably supporting a rotating piece of work to be profiled, said orifice being enlarged intermediate of its length, said cutter discs projecting into said enlarged orifice at opposite sides, means for mounting said block on a displaceable portion of the lathe for displacement in a direction axially of the work, and means for simultaneously rotating said shafts and the cutter discs thereon at a speed proportional to the speed of displacement of said movable portion of the lathe.

2. A device as claimed in claim 1 in which said last-mentioned means comprises pinions carried by said shafts within said block, rack means co-operating with said pinions, and means forming a sliding guide connection between said rack means and said block.

3. A device as claimed in claim 1 in which said last-mentioned means comprises pinions connected respectively with said shafts and spaced apart, and a rack member mounted on a stationary portion of the lathe and adapted to engage and simultaneously rotate said pinions and shafts to present various portions of the profiled periphery of the cutter discs to the work as the block advances axially of the work, said block being provided with a guide orifice into which said pinions project and said rack enters in guiding and supporting contact while engaging said pinions.

4. A device as claimed in claim 1 including spring elements individually co-operating with said shafts to return same, and adjustable stop means for accurately limiting the return rotation.

5. A device as claimed in claim 1 including spring elements connected with said shafts to return same in combination with stop means retractible in part at least to permit unobstructed operation of said shafts and being displaceable into shaft-arresting position.

6. A device of the class described, comprising a block member adapted for mounting in a lathe carriage, turret head or the like and having a work-receiving and guiding orifice co-axial with the work axis, cylindrical bores formed in said block at opposite sides of said work-guiding orifice, shafts rotatably mounted in said block axially of said bores and extending thereinto, cutter discs fitting snugly within certain of said bores in substantial supporting contact with the walls thereof and removably and non-rotatably connected with said shafts, said cutters projecting into said orifice, pinions secured to said shafts and arranged in a common plane, a cylindrical guide orifice extending through said block between said pinions, and a cylindrical rack member operating in said guide orifice in snug guiding contact and having toothed engagement at opposite sides with said pinions.

7. A machine tool comprising a block adapted to be rigidly mounted on a lathe having a central bore extending therethrough to receive the work to be machined and parallel cylindrical journal bores arranged at right angles to said centre bore and extending into said block from opposite sides and offset to either side of and intersecting said central bore and presenting end bearing faces, cutter shafts mounted in said journal bores, cutter discs mounted on said shafts extending into said central bore and engaging said bearing faces, spur gears mounted on said shafts in a common plane, and a rack rigidly mounted and extending between and meshing with said spur gears to turn said cutter discs in unison as the tool is moved axially of the work.

WILLIAM SPENCE.